US011537643B2

(12) United States Patent
Duke

(10) Patent No.: US 11,537,643 B2
(45) Date of Patent: Dec. 27, 2022

(54) SYSTEMS AND METHODS FOR COORDINATE-BASED SEARCH

(71) Applicant: Open Text SA ULC, Halifax (CA)

(72) Inventor: Jeremy Duke, Gilbert, AZ (US)

(73) Assignee: OPEN TEXT SA ULC, Halifax (CA)

( * ) Notice: Subject to any disclaimer, the term of this patent is extended or adjusted under 35 U.S.C. 154(b) by 101 days.

(21) Appl. No.: 17/222,935

(22) Filed: Apr. 5, 2021

(65) Prior Publication Data

US 2021/0224302 A1 Jul. 22, 2021

Related U.S. Application Data

(63) Continuation of application No. 16/396,092, filed on Apr. 26, 2019, now Pat. No. 10,970,320.

(51) Int. Cl.
*G06F 16/332* (2019.01)
*G06F 16/33* (2019.01)

(52) U.S. Cl.
CPC ...... *G06F 16/3323* (2019.01); *G06F 16/3344* (2019.01)

(58) Field of Classification Search
CPC .......................... G06F 16/3323; G06F 16/3344
USPC ........................................................ 707/722
See application file for complete search history.

(56) References Cited

U.S. PATENT DOCUMENTS

| 7,603,408 | B1 | 10/2009 | McGinnis et al. |
| 9,880,989 | B1 | 1/2018 | Cadabam et al. |
| 10,970,320 | B2 | 4/2021 | Duke |
| 2006/0046686 | A1 | 3/2006 | Hawkins et al. |
| 2012/0166940 | A1* | 6/2012 | Ennis ................. G06F 40/106 715/255 |
| 2016/0026730 | A1* | 1/2016 | Hasan ................. G06F 16/986 715/234 |
| 2017/0220546 | A1* | 8/2017 | Codrington ......... G06F 16/2282 |
| 2019/0230138 | A1* | 7/2019 | Lee ..................... G11B 27/02 |
| 2020/0097713 | A1* | 3/2020 | Cramer ............... G06V 30/414 |
| 2020/0126663 | A1 | 4/2020 | Lucas et al. |
| 2020/0342013 | A1 | 10/2020 | Duke |
| 2021/0234669 | A1* | 7/2021 | Singh ................. H04L 63/0435 |

OTHER PUBLICATIONS

Notice of Allowance issued for U.S. Appl. No. 16/396,092, dated Dec. 7, 2020, 11 pages.

* cited by examiner

*Primary Examiner* — James Trujillo
*Assistant Examiner* — Fariborz Khoshnoodi
(74) *Attorney, Agent, or Firm* — Sprinkle IP Law Group

(57) ABSTRACT

A microservice running in a cloud computing environment is operable to perform a coordinate-based search responsive to a request from a requester such as a viewer that serves a web application in a browser on a user device. The request contains a set of coordinates of a user-defined area which highlights information of interest that the user wants to redact from a document displayed by the viewer on the user device. The document is a rendition of an internal representation generated from an original source document. The internal representation has a coordinate system that maps the location of text data in the original source document. The microservice utilizes the coordinate system to search every instance of the information of interest in the text data, generates corresponding bounding boxes, and sends the coordinates of the bounding boxes to the viewer which creates the bounding boxes to highlight/block all the instances.

20 Claims, 10 Drawing Sheets

300

John-Doe-Resume.pdf

SUMMARY

312

Innovative, [patented] senior solutions architect with de manageability solutions for Enterprise, SMB and clou SW, firmware and HW products from concept - throu uential leader in multiple ramp up and g coding, software deve many differer management.
- PC / ability
- Softw e / Cloud / Hosted
- Stro mware and Software
- 8 publicly filed patents

PROFESSIONAL EXPER

ABC CORPORATION - Hillsboro, OR  310

Pages  Markups  Search Results  Layers

Shapes

Proofreading

Redactions

FIG. 3D

SYSTEMS AND METHODS FOR COORDINATE-BASED SEARCH

CROSS-REFERENCE TO RELATED APPLICATION(S)

This application is a continuation of, and claims a benefit of priority under 35 U.S.C. 120 from, U.S. patent application Ser. No. 16/396,092, filed Apr. 26, 2019, now U.S. Pat. No. 10,970,320, entitled "SYSTEMS AND METHODS FOR COORDINATE-BASED SEARCH," which is fully incorporated by reference herein for all purposes.

TECHNICAL FIELD

This disclosure relates generally to the field of data processing. More particularly, this disclosure relates to systems, methods, and computer program products for coordinate-based search and data processing.

BACKGROUND OF THE RELATED ART

Microservices are an architectural style or, more specifically, a variant of the service-oriented architecture (SOA) architectural style. In a microservices architecture, an application is structured as a collection of loosely-coupled services. Compared with the traditional approach in which monolithic applications are built with all their deployable components, these loosely-coupled services are more fine-grained and thus are referred to as "micro" services or "microservices."

More recently, microservices have been used to create cloud applications—applications that run in a cloud computing environment. Such a cloud application is generally built as a set of microservices, each of which runs its own processes, communicates through application programming interfaces (APIs), and can be deployed independently.

While microservices can provide scalability and agility to cloud applications, they are not without disadvantages. For instance, they can increase the complexity of a cloud application over a monolithic application. Further, as the microservices are loosely coupled, transaction management and data consistency can be problematic, making the cloud application difficult to maintain.

Accordingly, while advancements have been made in integrating the microservices architecture in some cloud computing environments, not all monolithic applications could be restructured as cloud applications built on the microservices architecture. One such example is a stand-alone application, which could run on an enterprise server or a user device, that is configured to remove sensitive content and privacy information from documents. Consequently, there is room for innovations and improvements.

SUMMARY OF THE DISCLOSURE

An object of the invention is to provide a microservice that runs in a cloud computing environment to provide a coordinate-based search service to a requester. The cloud computing environment includes a microservices infrastructure that supports a plurality of microservices, including a viewer and a publisher.

In some embodiments, a coordinate-based search method can include converting, by the microservice running in the cloud computing environment, an original source document to an internal representation, the internal representation having a coordinate system that maps out the location of text data in the original source document. In some embodiments, the internal representation has an extended description language (XDL) format. In some embodiments, the microservice can generate a rendition of the internal representation in a vector image format and provide the rendition to the viewer. In some embodiments, the vector image format comprises a scalable vector graphics (SVG) format. The viewer serves a web application in a browser application on a user device and displays the rendition on the user device. A user of the viewer can use a redaction tool to highlight or indicate an area (which can be a polygon, a rectangle, a bounding box, a region, etc.) of the rendition displayed on the user device that the user wishes to redact. The viewer can send a set of coordinates corresponding to the area of the rendition indicated by the user to the microservice.

In some embodiments, the coordinate-based search method can further include receiving, by the microservice from the viewer, the set of coordinates corresponding to the area of the rendition indicated by the user. Based on the set of coordinates and utilizing the coordinate system for the text data of the original source document, the microservice is operable to determine information of interest in the area of the rendition displayed on the user device and search the information of interest in the text data of the original source document. The information of interest can include, but is not limited to, a letter, word, sentence, string, pattern, regular expression, email address, name, credit card information, phone number, address, block of text, any personal identifiable information, any private information, or any confidential information. This coordinate-based search by the microservice can find any and all instances of the information of interest in the original source document. The microservice is further operable to determine, utilizing the coordinate system for the text data of the original source document, bounding boxes for the instances of the information of interest found in the original source document and provide the coordinates of the bounding boxes to the viewer for highlighting the instances of the information of interest in the rendition displayed on the user device.

In some embodiments, the viewer is operable to generate, utilizing the set of coordinates and the bounding boxes, pixel blocks to block the information of interest and the instances thereof within the rendition displayed on the user device. In some embodiments, the pixel blocks occupy same dimensions and locations of the information of interest and the instances thereof in the rendition displayed on the user device.

In some embodiments, responsive to a request to publish a redacted version of the original source document, the publisher is operable to transform the original source document into a final format without the information of interest and the instances thereof and with texture or color blocks replacing the information of interest and the instances thereof. In some embodiments, these blocks occupy same dimensions and locations of the information of interest and the instances thereof in the redacted version in which the information of interest and the instances thereof are not searchable.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIGS. 3A-3G are diagrammatical representations of an example use case of a highlight microservice disclosed herein according to some embodiments.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Figure 1:
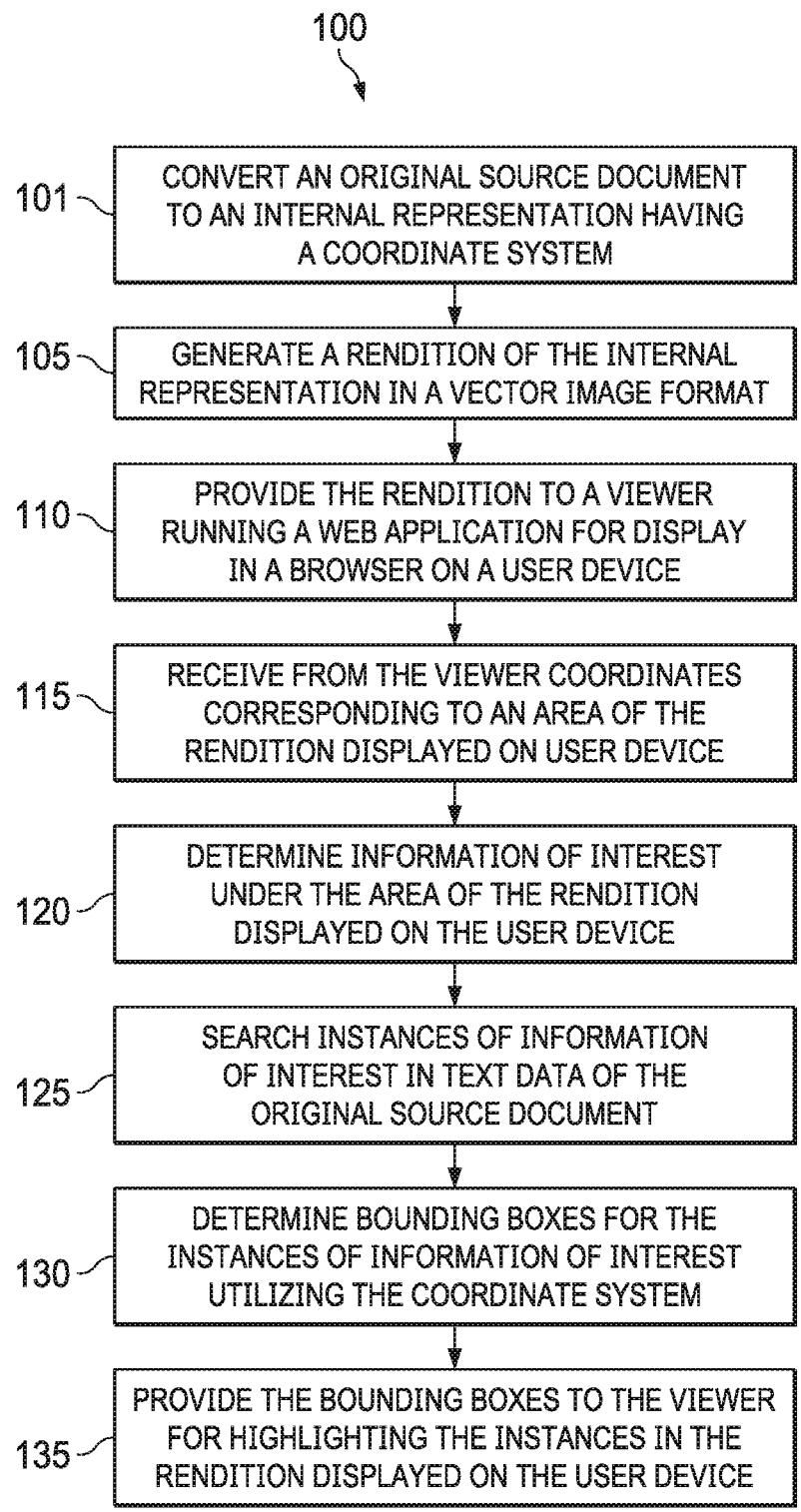
FIG. 1 is a flow chart illustrating an example of a method of coordinate-based search utilizing a microservice running on a cloud-based microservices infrastructure in a cloud computing environment according to some embodiments.

FIG. 1 is a flow chart illustrating an example of a method of coordinate-based search utilizing a microservice running on a cloud-based microservices infrastructure in a cloud computing environment. In some embodiments, this microservice can be referred to as the highlight microservice, the search microservice, or the search and highlight microservice. For the sake of convenience, in this disclosure, this microservice is referred to as the highlight microservice.

In the example of FIG. 1, method 100 can begin when an original source document is converted to an internal representation used by the highlight microservice (101). This conversion can take place automatically at upload time or triggered when some predetermined criteria are met, so long as it takes place prior to the viewing of the content through a viewer.

Original source documents can be uploaded to the cloud computing environment (through client systems of the cloud computing environment) utilizing various loaders (which could also be microservices provided by the cloud computing environment) that support different file formats (e.g., .doc, .pdf, engineering documents, etc.). All uploaded original source documents, regardless of their respective original format, are converted and/or ingested into a uniform internal representation.

This uniform internal representation is source-format neutral and has a coordinate system. In some embodiments, this source-format neutral internal representation can be in an extended description language (XDL) format. The highlight microservice relies on text information from an original source document that is expressed in the coordinate system of an XDL file. In some embodiments, other types of internal representations can also be used, so long as there is a mechanism for storing location information of text found in an original source document.

In geometry, a coordinate system refers to a system that uses numbers (which are referred to as coordinates) to uniquely determine the position of geometric elements in a two-dimensional Euclidean plane or three-dimensional space of Euclidean geometry. In computer graphics, a similar concept is applied to define the location of a picture element referred to as a "pixel." A pixel is a physical point in a raster image—a dot matrix data structure that represents a generally rectangular grid of pixels viewable via a monitor, paper, or other display screen or medium.

When an original source document is converted into the XDL format (which is an example of an internal representation used by the highlight service), a data location mapping model is created to map the text information found in the original source document to this grid of pixels. The data location mapping model is essentially a coordinate-based map that contains the location information (x-y coordinates) of each character in the original source document. Thus, it is also referred to herein as a coordinate system. Each XDL file contains a description of a coordinate system that particularly maps the coordinates of text found in a corresponding original source document. In some embodiments, converted documents in the XDL format (e.g., XDL files) can be stored in the cloud computing environment, for instance, in an object-relational database management system (ORDBM) in the cloud-based microservices infrastructure.

In embodiments disclosed herein, internal representations can be used internally by the microservices running on the cloud-based microservices infrastructure in the cloud computing environment, but they are not communicated outside of the cloud computing environment, for instance, to the client side. Instead, a rendition of an internal representation is generated in a vector image format which can be rendered by a browser application (105). In some embodiments, a rendition of the internal representation is generated in the World Wide Web Consortium (W3C) standard vector image format called scalable vector graphics (SVG).

In some embodiments, the rendition (which, in this example, is an SVG file) is provided to a viewer running a web application in a web browser on a user device (110). In some embodiments, the viewer can be a microservice provided by the cloud computing environment. All major modern web browsers support SVG rendering. Accordingly, the viewer, which implements a web application that runs inside the web browser on the user device, can cause the web browser to render the SVG file.

Before further describing method 100, a brief discussion on the relationship between the highlight microservice and the viewer might be helpful. While the highlight microservice can service the viewer (e.g., through the selection of a redaction tool), the functionality of the highlight microservice is independent of the viewer. Particularly, the coordinate-based search functionality of the highlight microservice is independent of the redaction functionality of the viewer. In a sense, the redaction functionality of the viewer makes use of the coordinate-based search functionality of the highlight microservice by calling the highlight microservice with a query (e.g., an API call), receiving a response (e.g., a coordinate-based search result) from the highlight microservice, and using the response from the highlight microservice to update a view displayed through the viewer. An example of this use case is provided below.

As discuss above, the view displayed in the web browser through the viewer is neither the original source document nor the internal representation (e.g., an XDL file) generated from the original source document. Rather, it is a view (e.g., a page) of a document rendered from a rendition of the internal representation (e.g., a SVG file). A user of the viewer can interact with the SVG file displayed through the web browser using any suitable pointing device or input interface that allows the user to input spatial data to the user device. As the pointing device or input interface interacts with the display device, it sends a signal containing the coordinates of the pixels at that point back to the user device which, in turn, communicates the coordinates of the pixels at that point to the browser. For example, suppose the user selects a redaction tool of the viewer and drags a pointer of a mouse (which is a non-limiting example of a pointing device) across a display screen diagonally to define an area containing information of interest (e.g., a letter, word, sentence, string, pattern, regular expression, email address, name, credit card information, phone number, address, block of text, any personal identifiable information, any private information, any confidential information, etc.) that needs to be redacted. From the user's perspective, as soon as the user releases the mouse click, every instance of the information of interest in the document (that the user is viewing) is highlighted on the display screen instantaneously. At this time, the user can choose to "burn in" (making the redactions permanent) by selecting a publication tool from a menu in the viewer to create a new document without the instances of the information of interest. As discussed below, the publication tool can be provided by a publication microservice that also runs on the cloud-based microservices infrastructure in the cloud computing environment.

Behind the scene, when the user releases the mouse click, the coordinates of the area in the document defined by the user on the display screen are communicated from the display screen to the mouse to the user device to the operating system to the web browser to the web application which is run by the viewer. The viewer, in turn, communicates the coordinates of the user-defined area to the highlight microservice (e.g., via an API of the highlight microservice). Neither the viewer nor the web browser has the original source document or the location information of the text data in the original source document. Thus, neither the viewer nor the web browser can search instances of the information of interest in the original source document.

The highlight microservice receives the coordinates corresponding to the area of the rendition displayed on the user device and performs a coordinate-based search (115). In some embodiments, this coordinate-based search includes determining the information of interest that is under, within, or otherwise covered by the area drawn by the user on the display screen over what is actually a rendition of the original source document (which the user or someone else had uploaded to the cloud computing environment) (120). In some embodiments, this determination is made by the highlight microservice using the coordinate system associated with the document by, for instance, performing a hit test.

In computer graphics programming, hit-testing (which is also referred to as hit detection, picking, or pick correlation) refers to a standard graphical operation which determines whether a user-controlled cursor (such as a mouse pointer) intersects a given graphical object (such as a shape, line, or curve) drawn on the screen. In this case, using the coordinate system, the highlight microservice can perform a hit test to find information of interest—all the characters in the original source document that intercept or overlap with the area.

The highlight microservice can then search the text data of the original source document to find all the instances of the information of interest (125). For each instance thus found, the highlight microservice is operable to determine a bounding box, again using the coordinate system (130). The highlight microservice returns the coordinates of these bounding boxes to the viewer (135). The viewer, in turn, uses the coordinates of the bounding boxes provided by the highlight microservice to update the view so that every instance of the information of interest (including the one drawn by the user) is highlighted on the display screen.

Although the coordinate-based search request example described above takes place in a cloud (which refers to a distributed, global computer network such as the Internet), the response is instantaneous and the user does not experience any noticeable delay in between a mouse down event (which starts to draw an area for redaction) and a mouse up event (which completes the drawing of the area) when every instance of the information of interest highlighted by the user is automatically highlighted on the display screen. In some embodiments, this is enabled by a fast and lightweight microservices infrastructure, an example of which is shown in FIG. 2.

Figure 2:
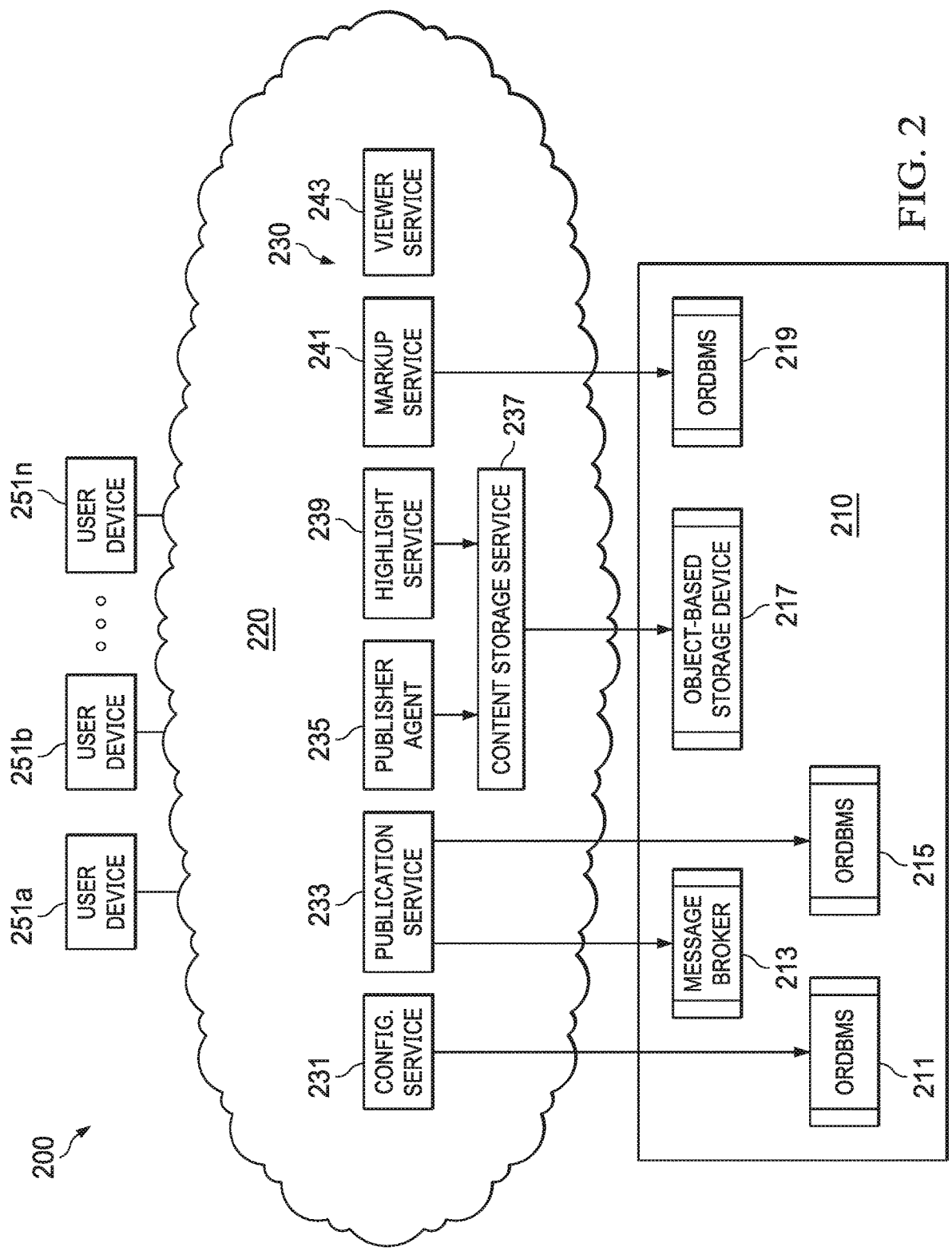
FIG. 2 depicts a diagrammatical representation of a cloud computing environment having a microservices infrastructure supporting a plurality microservices running in a cloud to provide various microservices to client devices according to some embodiments.

FIG. 2 depicts a diagrammatical representation of cloud computing environment 200 having microservices infrastructure 210 supporting a plurality microservices 230 running in cloud 220 to provide various microservices to client devices 251a, 251b, . . . , 251n. There could be hundreds of microservices 230, all of which can be stateless. Further, there could be thousands of publisher agents 235 (workers) living in cloud 220. For the sake of brevity, in the example of FIG. 2, the plurality microservices 230 can include configuration service 231, publication service 233, publisher agent 235, content storage service 237, highlight service 239, markup service 241, and viewer service 243. As described below, markup service 241 is responsible for saving and storing and highlight service 239 is responsible for performing a coordinate-based search and returning coordinates of regions of test.

Viewer service 243 can be tied to some of the plurality microservices 230 shown in FIG. 2 (e.g., highlight service 239, markup service 241, and publication service 233).

Configuration service 231 is used by publication service 233 to configure job descriptions for jobs enqueued (i.e., placed in a queue by message broker 213) for publisher agents to pick up. Configuration service 231 is operable to perform multi-stage definition of a job. The cost of getting that job incorrect is substantial because there could be a long time difference between when a job is requested to when the job is picked up. Configuration service 231 can verify job requests long before they are picked up by publisher agents for processing.

A client, which could be viewer service 243 or another service, would issue a request to one of the publication microservices (e.g., publication service 233). This request can be a request to redact certain text (as identified by a set of coordinates) from a certain document (as identified by a document identifier). Publication service 233 is operable to request configuration service 231 to validate the request and to construct a job description which is then enqueued (e.g., by message broker 213) to be picked up by the next available publisher agent 235.

Publisher agent 235 would pick up the job, the job description, the source document, and the redaction instructions, process the job (by calling other appropriate microservices, as described below), create a new document in a final output format, store the final output document in some kind of block store (e.g., through content storage service 237 in object-based cloud storage system or device 217 such as Swift from the OpenStack Object Store project), and notify the universe of cloud computing environment 200 of the new final output document. The final output document, which can be generated using an appropriate driver or output generator (which can be part of microservices infrastructure 210), can be in any suitable final output format (e.g., Portable Document Format (PDF), Tagged Image File Format (TIFF), raster image format such as Joint Photographic Experts Group (JPEG or JPG), Portable Graphics Format (PNG), etc., archive file format such as a zip file, etc.).

In some embodiments, viewer 243 can serve a web application through a web browser (which is also referred to herein as a browser application or browser) that runs on a user device. In some embodiments, original source documents, the internal representations of the original source documents (e.g., in the XDL format), and final output documents (which are generated by appropriate drivers and/or output generators via publication service 233) can be stored in object-based cloud storage system or device 217.

In some embodiments, markup service 241 is operable to store the bounding boxes (which can also be referred to as polygons, rectangles, and so on and which are defined by coordinates in the XDL coordinate space) in ORDBM 219. In some embodiments, markup service 241 is responsible for storing instructions that can be shown, run, and/or rendered in viewer 243 and that could have some semantic meaning (e.g., redactions, comments, etc.). While FIG. 2 shows ORDBMS 211, ORDBMS 215, and ORDBMS 219, in some embodiments, only one ORDBM is necessary.

The redaction tools of viewer 243 are serviced by highlight service 239. In some embodiments, responsive to a call (e.g., by a publisher agent that performs the actual job), highlight service 239 is operable to retrieve, through content storage service 237, an XDL file from object-based cloud storage system or device 217. The XDL file contains the coordinate system that maps out the exact locations of text found in the original source document. Highlight service 239 takes a set of coordinates received from viewer 243, determines what information of interest corresponds to the set of coordinates (by searching the set of coordinates in the coordinate system and determining from the text data the information of interest located at the set of coordinates in the coordinate system), searches the text data for instances of the information of interest, determines the locations of those instances, generates a bounding box for each such instance, and communicates a response containing the coordinates of all the bounding boxes to viewer 243. In turn, viewer 243 is operable to transform the coordinates of all the bounding boxes into corresponding pixel locations of blocks highlighting the instances of the information of interest on the display screen. In this case, markup service 241 is operable to store the coordinates of the highlighted instances in the ORDBMS.

If the user decides to commit to redacting all the instances of the information of interest, now highlighted on the display screen, the user can select the publication tool from a menu of viewer 243. This publication tool can be serviced by publication service 233 (or, technically, through a publisher agent). In response, publication service 233 can retrieve (e.g., via a markup microservice API call to markup service 241) the instructions (e.g., highlighted instances) from the ORDBM, generate a final output document in a final output format (e.g., in PDF) from the XDL file, and store the final output document in object-based cloud storage system or device 217. In generating the final output document, publication service 233 can utilize the instructions provided by markup service 241 from the ORDBMS to determine the locations of the instances to be redacted. This determination can be made by performing a hit test of known text characters on a page and compare each character to a given bounding box, polygon, or rectangle indicating an area of redaction. Any intercepting or overlapping characters would be excluded from being rendered in the final output document. Because the dimension of each character cell is known, a solid texture or color block having the same dimension of an excluded character can instead be place in the final output document as a new representation of the excluded character. Since the excluded characters are not included in this generation process, they are not searchable in the final output document.

Although a conventional redaction tool may allow a user to black out or cover text in a document, it only gives the impression that the text has been "redacted." In reality, the covered text still exists and is searchable. This means that someone reviewing the document with the "redacted" text can undo the redaction and see the text by, for instance, copying and pasting the redacted text into a new document. Further, to properly redact a document, a conventional redaction tool may require that the original document be modified. In embodiments disclosed herein, original source documents are not modified or changed and redacted text is not traceable or searchable in the final output documents.

FIGS. 3A-3G are diagrammatical representations of an example use case of highlight service 239. A user may, through a browser on a user device, log in to a viewer microservice running in a cloud computing environment (e.g., cloud computing environment 200). In this case, the user wishes to view a document that was uploaded to the cloud computing environment.

Responsive to the user request, document 310, and not the original source document or an internal representation of the original source document, is displayed by the viewer through web-based user interface 300. Document 310 is a rendition of the internal representation of the original source document. As described above, the internal representation has a coordinate system that maps out all the text data contained in the original source document. In one embodiment, the original source document, the internal representation, and the rendition thereof are associated through a unique document identifier.

Figure 3A:
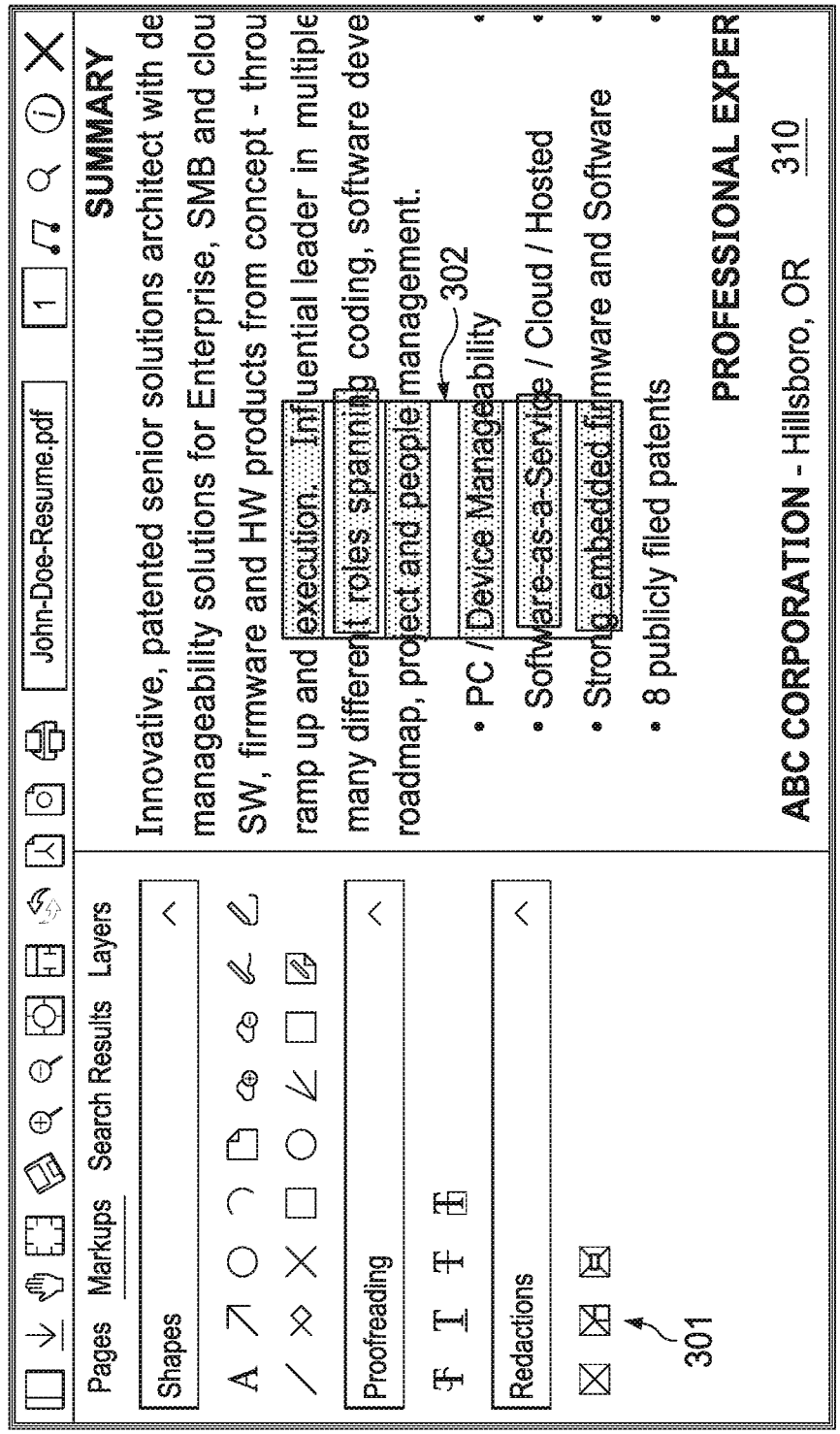
Figure 3B:
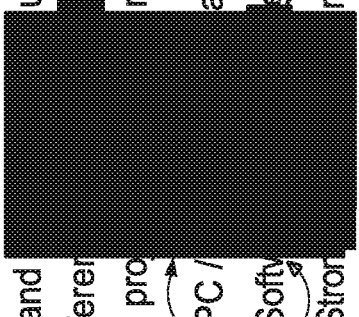

In some embodiments, the viewer can provide a menu of various redaction tools serviced by a highlight microservice disclosed herein. In the example of FIG. 3A, redaction tool 300 is selected and area 302 is marked up by the user for redaction. While the user is defining area 302 (e.g., with a click-and-drag gesture), area 302 is highlighted but the text underneath area 302 is still visible. Referring to FIG. 3B, as soon as the user is done defining area 302 (e.g., by lifting the mouse click), area 302 is blacked out and the text underneath area 302 is not visible. As described above, the coordinates of area 302 are communicated (e.g., in real time via an API of the highlight microservice) by the viewer to the highlight microservice (along with the document identifier identifying document 310). In response, the highlight microservice is operable to identify the text underneath area 302 utilizing the coordinates provided by the viewer and the internal representation corresponding to document 310.

The internal representation includes a coordinate system which maps out all the characters in the original source document. This means that the center of every single character on each page of document 310 can be determined. The highlight microservice relies on this knowledge to determine what text is currently selected by a user. In the example of FIG. 3B, if the center of a character falls within area 302 (through a comparison of the center of the character and the coordinates of area 302), the entire character will be blocked (e.g., characters 307). If the center of a character falls outside of area 302, the portion of the character outside of area 302 will not be blocked (e.g., character 305).

Figure 3D:
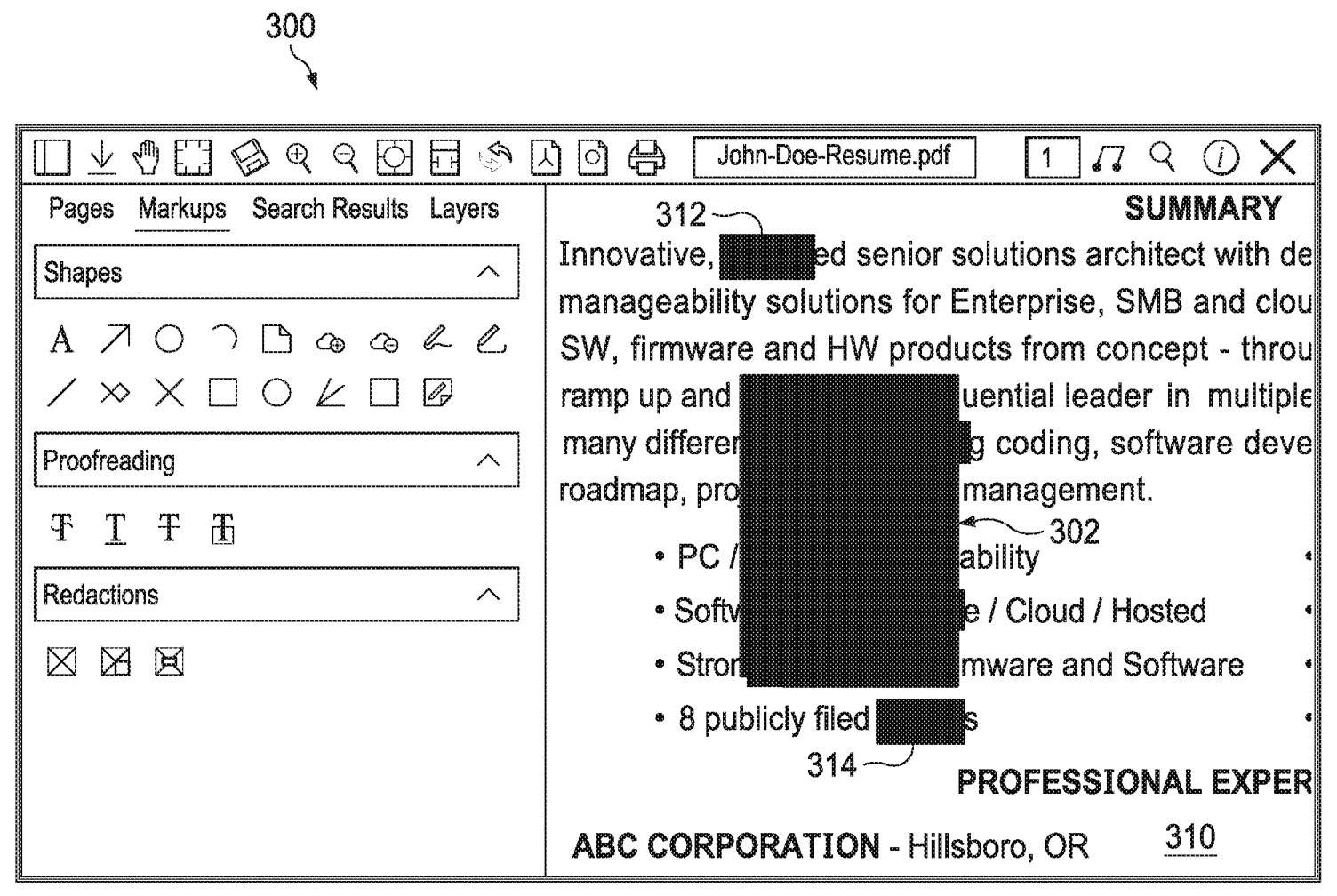

The highlight microservice also relies on the coordinate system to determine where instances of the text appear in the original source document (and hence in document 310). FIG. 3C illustrates an example in which redaction tool 303 is selected to redact text of interest 312 (e.g., "patent"). FIG. 3D shows that, as soon as text of interest 312 is defined by the user using redaction tool 303, all instances 314 of "patent" are highlighted in a solid color (e.g., black, white, or any shade or texture that completely blocks the instances on the display screen) instantaneously. If desired, the user can scroll document 310 up and/or down to view all the automatically highlighted instances.

Figure 3E:
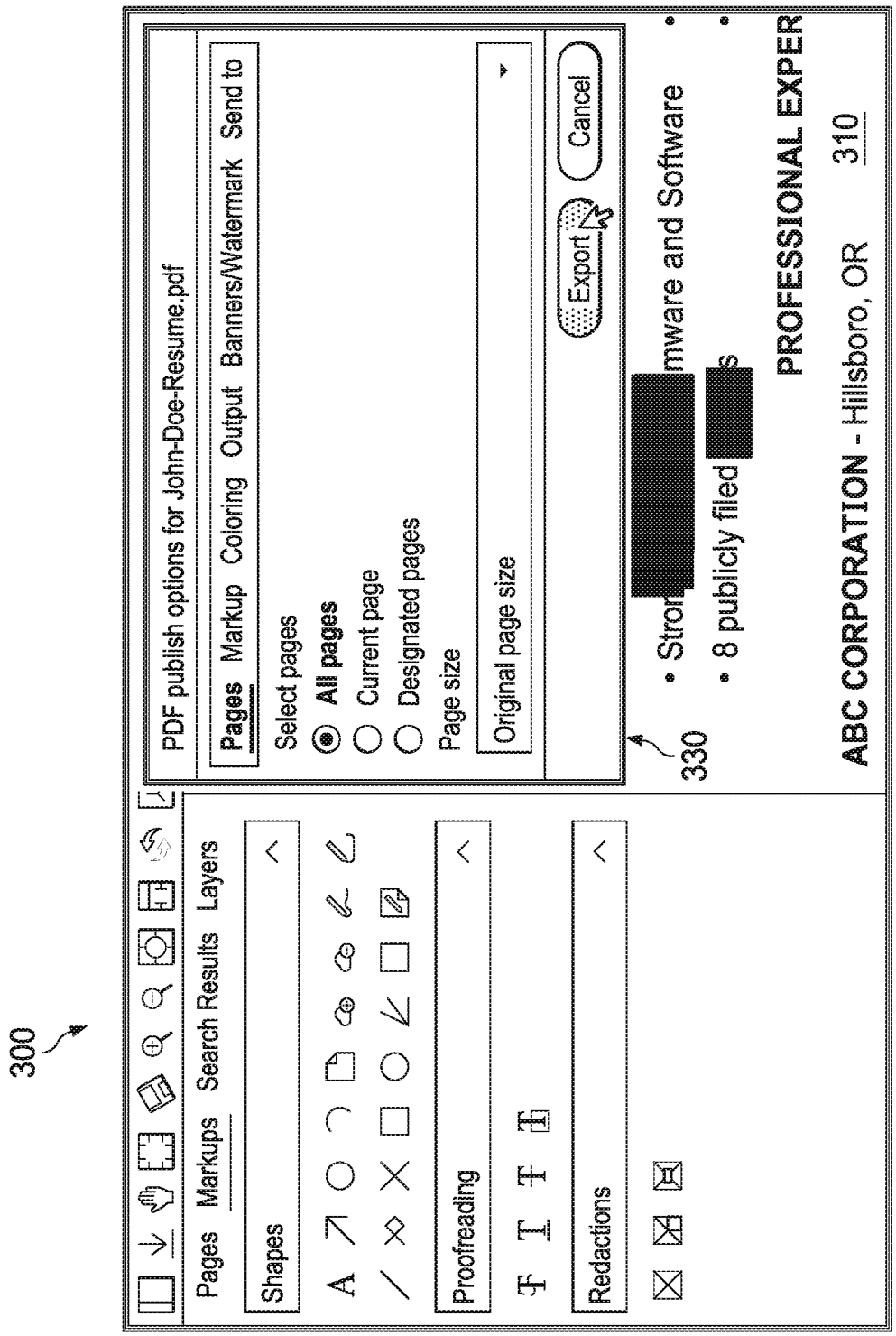
Figure 3F:
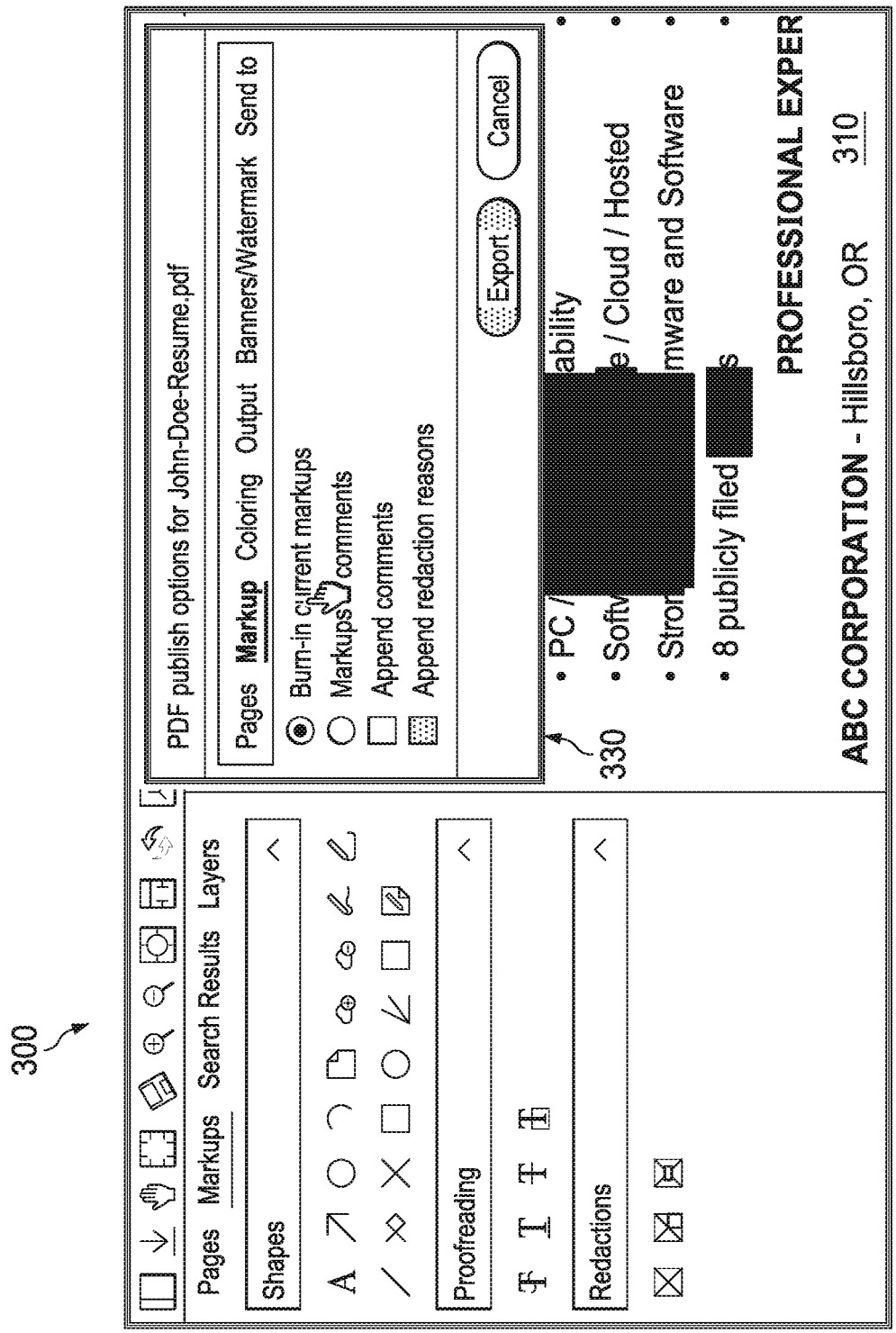
Figure 3G:
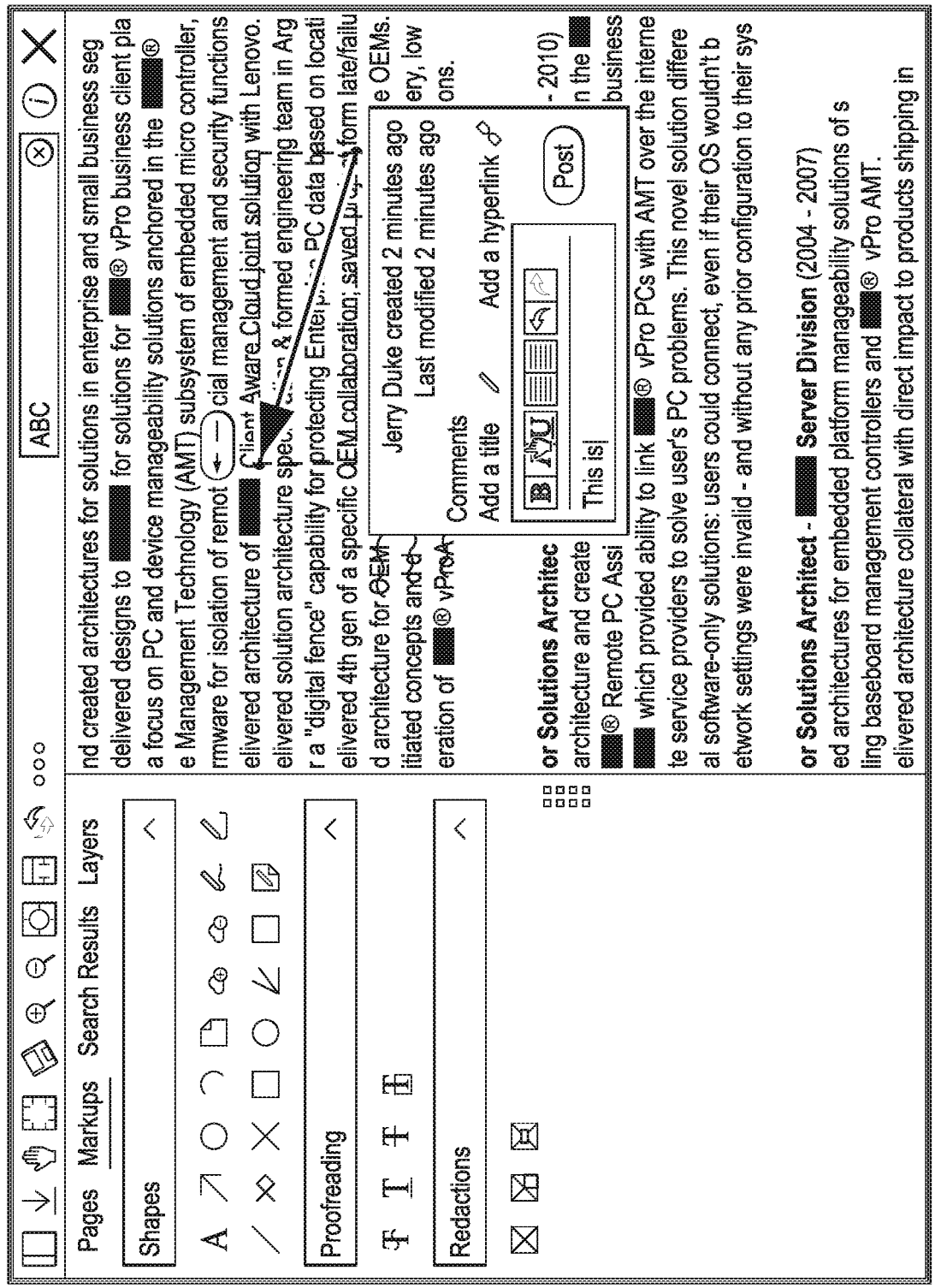

At this time, the highlighted instances (e.g., instances 312, 314) have not been made permanent and thus can be referred to as "markups." If the user decides to commit to the markups and permanently redact the highlighted instances, the user can select publication tool 330 provided by the viewer, as shown in FIG. 3E. Publication tool 330 can be serviced by a publication service (see FIG. 3E) and a markup service (see FIG. 3F) disclosed here. As shown in FIG. 3F, under the "Markup" menu of publication tool 330, the user can choose to "burn-in" all the current markups displayed in the viewer. For the purpose of illustration, FIG. 3E shows different kinds of markups (with semantic information such as comments and without semantic information such as an arrow or squiggly line) that can also be burned in with the highlighted instances.

Figure 4:
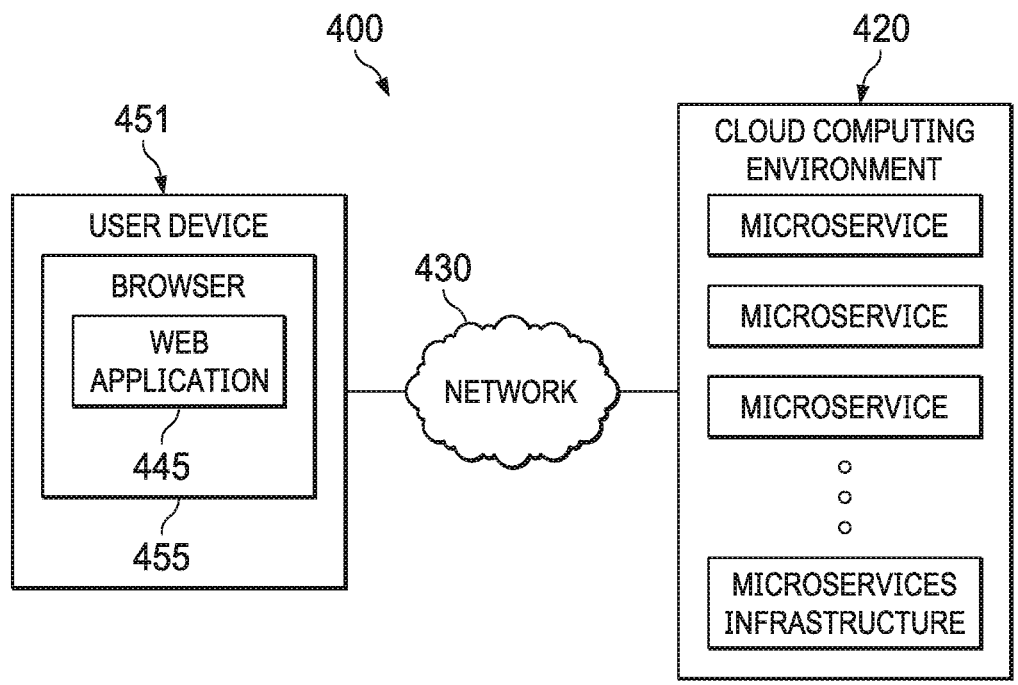
FIG. 4 depicts a diagrammatic representation of a network environment in which embodiments disclosed herein can be implemented.

FIG. 4 depicts a diagrammatic representation of network environment 400 in which embodiments disclosed herein can be implemented. In the example of FIG. 4, cloud computing environment 420 provides a plurality of microservices over network 430 to user device 451. One of the plurality of microservices can be a viewer disclosed herein and another one of the plurality of microservices can be a highlight microservice disclosed herein. The viewer can serve web application 445 which runs in a browser environment provided by browser 455 on user device 451. A user of user device 451 (or another user using another user device) may upload an original source document to cloud computing environment 420. As described above, at uploading time or later triggered by some predetermined criteria (e.g., per a schedule, on demand, etc.), an XDL file is generated from the original source document and a SVG file is generated from the XDL file. The SVG file is sent to the viewer which, in turn, presents the content of the SVG file in browser 455 through web application 445. The viewer gets mouse coordinates defining an area of interest from browser 455 (which gets those coordinates from a pointing device used by the user to interact with the display screen of user device 451), and sends the coordinates to the highlight microservice.

The highlight microservice is configured for allowing a requester (e.g., an application or software such as the viewer) to send it the x-y coordinates of an area or region of interest (e.g., coordinates that define the four corners of a polygon, rectangle, bounding box, etc.) which a user has selected on a view of a document displayed on a user device. The highlight microservice is operable to determine, using a coordinate system that was created from the original source document and that maps out the locations of all the characters in the original source document, a string or pattern in the selected area, search the text to find every instance of the string or pattern in the document, determine the coordinates of those instances utilizing the coordinate system, generate instructions for ultimately removing them from the document, and send the coordinates (across all the pages of the document) back to the requester.

In some embodiments, the highlight microservice utilizes the Representational State Transfer (REST) API transported over HyperText Transport Protocol (HTTP) or HTTP Secure (HTTPS). The grammar and protocol of this REST API is defined in the microservices infrastructure. As an example, the viewer can perform a HTTP POST operation to the REST API of the highlight microservice, providing an encoded representation of the area of interest that the user has marked up on the display screen using a redaction tool. Different redaction tools may be associated with different highlight microservice APIs.

In some embodiments, the highlight service gets the HTTP POST request, performs its coordinate-based search service as described above, and returns in the response to the POST request a JavaScript Object Notation (JSON) representation of all the bounding boxes, polygons, or rectangles instructions for automated highlighting and subsequent redaction. The viewer takes the instructions and creates the bounding boxes, polygons, or rectangles (referred to as meta representations) accordingly to block the instances from view. When the user is ready to execute the redaction, the viewer sends the meta representations to the publication microservice for "burn in" which, in turn, results in the generation of a final output document (e.g., a redacted PDF). In some embodiments, after the redaction is executed (i.e., the blocks are burned into the final output document), the redacted version can be communicated to the viewer and the viewer can update the screen to show the redacted version (e.g., in PDF). Because the characters that have been redacted are replaced by bounding boxes, polygons, rectangles, areas, regions, etc. occupying the same dimensions and locations, the layout and the remaining characters are not affected by the redaction and can remain the same as shown in the original source document. This can be useful in some cases (e.g., for eDiscovery).

Figure 5:
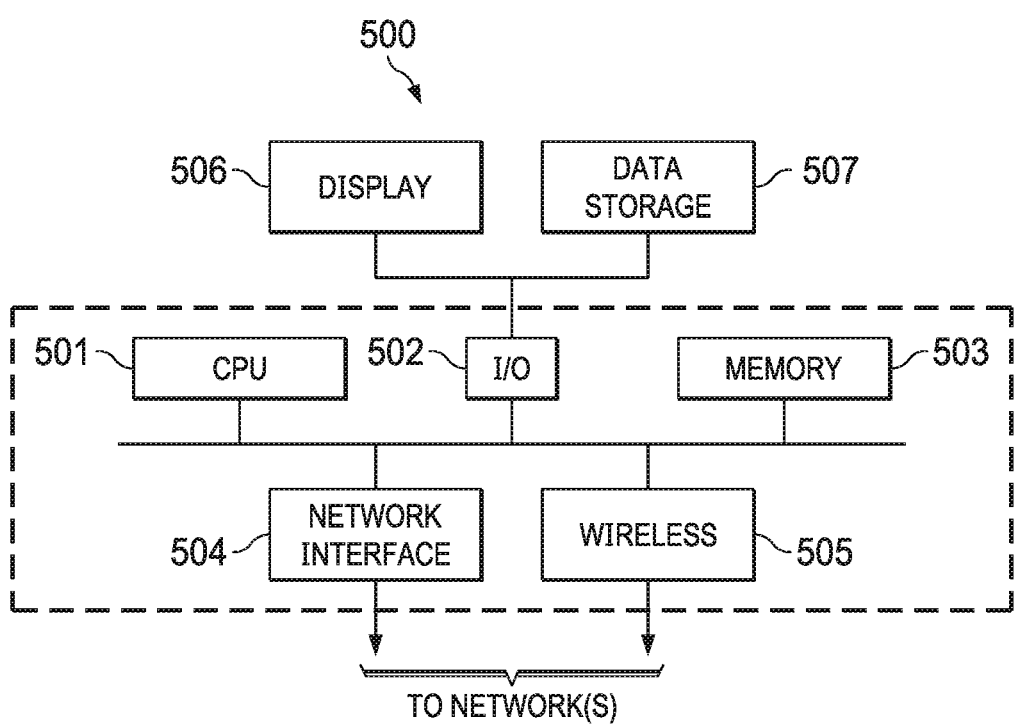
FIG. 5 depicts a diagrammatic representation of a data processing system for implementing a coordinate-based search method disclosed herein according to some embodiments.

FIG. 5 depicts a diagrammatic representation of a data processing system for implementing a coordinate-based search method disclosed herein. As shown in FIG. 5, data processing system 500 may include one or more central processing units (CPU) or processors 501 coupled to one or more user input/output (I/O) devices 502 and memory devices 503. Examples of I/O devices 502 may include, but are not limited to, keyboards, displays, monitors, touch screens, printers, electronic pointing devices such as mice, trackballs, styluses, touch pads, or the like. Examples of memory devices 503 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 500 can be coupled to display 506, information device 507 and various peripheral devices (not shown), such as printers, plotters, speakers, etc. through I/O devices 502. Data processing system 500 may also be coupled to external computers or other devices through network interface 504, wireless transceiver 905, or other means that is coupled to a network such as a local area network (LAN), wide area network (WAN), or the Internet.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer, or a special purpose computer or data processor that is specifically programmed, configured, or constructed to perform the functions described in detail herein. The invention can also be employed in distributed computing environments, where tasks or modules are performed by remote processing devices, which are linked through a communications network such as LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

As is known to those skilled in the art, a suitable computer system can include a CPU, a ROM, a RAM, a HD, and I/O device(s). The I/O devices can include a keyboard, monitor, printer, electronic pointing device (for example, mouse, trackball, stylus, touch pad, etc.), or the like. ROM, RAM, and HD are non-transitory computer memories for storing computer-executable instructions executable by the CPU or capable of being compiled or interpreted to be executable by the CPU.

Suitable computer-executable instructions may reside on a non-transitory computer readable medium (e.g., ROM, RAM, and/or HD), hardware circuitry or the like, or any combination thereof. Within this disclosure, the term "non-transitory computer readable medium" is not limited to ROM, RAM, and HD and can include any type of data storage medium that can be read by a processor. Examples of non-transitory computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nano-engineered systems, components, and mechanisms may be used. In general, the functions of the invention can be achieved by any means as is known in the art. For example, distributed, or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the accompanying appendices, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and in the accompanying appendices, the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure. The scope of the present disclosure should be determined by the following claims and their legal equivalents.

What is claimed is:

1. A method for redacting areas of interest in a source document using a set of microservices, comprising:
    generating, by a publisher microservice in a set of microservices executing on one or more network servers, a coordinate-based rendition corresponding to a source document stored in a document management system;
    receiving a selection from a viewer microservice in the set of microservices executing on the one or more network servers, the viewer microservice displaying the coordinate-based rendition in a viewer to a user;
    generating information of interest based on the received selection;
    identifying, in the source document, areas of interest corresponding to the information of interest;
    mapping the areas of interest to the coordinate-based rendition and generating corresponding bounding boxes to the mapped areas of interest;
    storing the bounding boxes with reference to the coordinate-base rendition of the source document in the document management system; and
    displaying, by the viewer microservice, the stored bounding boxes in the coordinate-based rendition corresponding to the source document, the bounding boxes redacting the areas of interest in the viewer.

2. The method of claim 1, wherein the source document comprises textual and non-textual information and wherein the information of interest comprises at least one of textual information of interest or non-textual information of interest.

3. The method of claim 1, wherein the information of interest contains sensitive information.

4. The method of claim 1, wherein the bounding boxes replace the areas of interest in the coordinate-based rendition.

5. The method of claim 4, wherein the bounding boxes replace pixels in the coordinate-based rendition such that the corresponding content in the source document is irretrievable using the viewer.

6. The method of claim 1, wherein the source document is stored in a format comprising PDF, JPG, TIFF, PNG, DOC, an architectural format, a spreadsheet format, or an archival format.

7. The method of claim 1, wherein the coordinate-based rendition comprises an extended description language (XDL) and wherein the viewer displays the coordinate-based rendition using a scalable vector graphics (SVG) format.

8. The method of claim 1, wherein the set of microservices comprises a highlight microservice and a markup microservice, the method further comprising:
   retrieving, by the highlight microservice coupled to the viewer microservice, an extended description language (XDL) file, searching the XDL for the areas of interest, and displaying the generated bounding boxes in the viewer; and
   storing, by the markup microservice coupled to the publisher microservice, a version of the source document in the document management system, the version comprising the redacted areas of interest.

9. A system for redacting areas of interest in a source document using a set of microservices, the system comprising:
   a processor;
   a non-transitory computer-readable medium; and
   instructions stored on the non-transitory computer-readable medium and translatable by the processor for:
      generating, by a publisher microservice in a set of microservices executing on one or more network servers, a coordinate-based rendition corresponding to a source document stored in a document management system;
      receiving a selection from a viewer microservice in the set of microservices executing on the one or more network servers, the viewer microservice displaying the coordinate-based rendition in a viewer to a user;
      generating information of interest based on the received selection;
      identifying, in the source document, areas of interest corresponding to the information of interest;
      mapping the areas of interest to the coordinate-based rendition and generating corresponding bounding boxes to the mapped areas of interest;
      storing the bounding boxes with reference to the coordinate-base rendition of the source document in the document management system; and
      displaying, by the viewer microservice, the stored bounding boxes in the coordinate-based rendition corresponding to the source document, the bounding boxes redacting the areas of interest in the viewer.

10. The system of claim 9, wherein the source document comprises textual and non-textual information and wherein the information of interest comprises at least one of textual information of interest or non-textual information of interest.

11. The system of claim 9, wherein the information of interest contains sensitive information.

12. The system of claim 9, wherein the bounding boxes replace the areas of interest in the coordinate-based rendition.

13. The system of claim 12, wherein the bounding boxes replace pixels in the coordinate-based rendition such that the corresponding content in the source document is irretrievable using the viewer.

14. The system of claim 9, wherein the source document is stored in a format comprising PDF, JPG, TIFF, PNG, DOC, an architectural format, a spreadsheet format, or an archival format.

15. The system of claim 9, wherein the coordinate-based rendition comprises an extended description language (XDL) and wherein the viewer displays the coordinate-based rendition using a scalable vector graphics (SVG) format.

16. The system of claim 9, wherein the set of microservices comprises a highlight microservice and a markup microservice and wherein the instructions are further translatable by the processor for:
   retrieving, by the highlight microservice coupled to the viewer microservice, an extended description language (XDL) file, searching the XDL for the areas of interest, and displaying the generated bounding boxes in the viewer; and
   storing, by the markup microservice coupled to the publisher microservice, a version of the source document in the document management system, the version comprising the redacted areas of interest.

17. A computer program product for redacting areas of interest in a source document using a set of microservices, the computer program product comprising:
   a non-transitory computer-readable medium storing instructions translatable by a processor for:
      generating, by a publisher microservice in a set of microservices executing on one or more network servers, a coordinate-based rendition corresponding to a source document stored in a document management system;
      receiving a selection from a viewer microservice in the set of microservices executing on the one or more network servers, the viewer microservice displaying the coordinate-based rendition in a viewer to a user;
      generating information of interest based on the received selection;
      identifying, in the source document, areas of interest corresponding to the information of interest;
      mapping the areas of interest to the coordinate-based rendition and generating corresponding bounding boxes to the mapped areas of interest;
      storing the bounding boxes with reference to the coordinate-base rendition of the source document in the document management system; and
      displaying, by the viewer microservice, the stored bounding boxes in the coordinate-based rendition corresponding to the source document, the bounding boxes redacting the areas of interest in the viewer.

18. The computer program product of claim 17, wherein the source document comprises textual and non-textual information, wherein the information of interest comprises at least one of textual information of interest or non-textual information of interest, and wherein the information of interest contains sensitive information.

19. The computer program product of claim 17, wherein the bounding boxes replace pixels in the coordinate-based rendition such that the corresponding content in the source document is irretrievable using the viewer.

20. The computer program product of claim 17, wherein the set of microservices comprises a highlight microservice and a markup microservice and wherein the instructions are further translatable by the processor for:
   retrieving, by the highlight microservice coupled to the viewer microservice, an extended description language (XDL) file, searching the XDL for the areas of interest, and displaying the generated bounding boxes in the viewer; and
   storing, by the markup microservice coupled to the publisher microservice, a version of the source document in the document management system, the version comprising the redacted areas of interest.

* * * * *